United States Patent
Wong

(10) Patent No.: US 8,217,542 B2
(45) Date of Patent: Jul. 10, 2012

(54) ELECTRIC MOTOR

(75) Inventor: Ben To Fan Wong, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 215 days.

(21) Appl. No.: 12/474,768

(22) Filed: May 29, 2009

(65) Prior Publication Data

US 2009/0295241 A1 Dec. 3, 2009

(30) Foreign Application Priority Data

May 30, 2008 (GB) .................................. 0809764.4

(51) Int. Cl.
*H02K 11/02* (2006.01)
(52) U.S. Cl. ......................................... 310/72
(58) Field of Classification Search .............. 310/72
See application file for complete search history.

(56) References Cited

U.S. PATENT DOCUMENTS

| | | | |
|---|---|---|---|
| 4,908,590 A * | 3/1990 | Sakamoto et al. | 333/183 |
| 5,112,253 A | 5/1992 | Swift | |
| 5,580,280 A | 12/1996 | Minich et al. | |
| 5,610,467 A * | 3/1997 | Shiah et al. | 310/239 |
| 5,624,277 A | 4/1997 | Ward | |
| 5,982,253 A | 11/1999 | Perrin et al. | |
| 6,028,353 A * | 2/2000 | Nakano et al. | 257/701 |
| 6,229,226 B1 | 5/2001 | Kramer et al. | |
| 6,300,696 B1 * | 10/2001 | Wong | 310/68 R |
| 6,580,194 B2 * | 6/2003 | Mizutani et al. | 310/239 |
| 6,608,410 B2 * | 8/2003 | Sato et al. | 310/67 R |
| 6,858,955 B2 * | 2/2005 | Lau | 310/51 |
| 7,141,899 B2 * | 11/2006 | Anthony et al. | 310/68 R |
| 2007/0052437 A1 | 3/2007 | Bhatti | |
| 2009/0160268 A1* | 6/2009 | Ragnone et al. | 310/51 |

FOREIGN PATENT DOCUMENTS

| | | | |
|---|---|---|---|
| DE | 19902433 | * | 9/2000 |
| EP | 0608916 | * | 8/1994 |
| EP | 1193839 A2 | | 4/2002 |
| EP | 1624550 A1 | | 2/2006 |
| GB | 2217136 A | | 5/1988 |
| WO | 00/36728 | * | 6/2000 |
| WO | 03/063323 | * | 7/2003 |

OTHER PUBLICATIONS http://en.wikipedia.org/wiki/Ferrite_bead Apr. 2011.*

* cited by examiner

*Primary Examiner* — Burton Mullins
(74) *Attorney, Agent, or Firm* — Muncy, Geissler, Olds & Lowe, PLLC

(57) ABSTRACT

A noise suppression circuit uses a chip type ferrite bead as a major component of the noise suppression circuit. A motor using this circuit and the compact arrangement of the noise suppression circuit within the layout of an end cap of the motor is also disclosed. The preferred embodiment avoids soldering of the ferrite bead during assembly of the motor.

14 Claims, 4 Drawing Sheets

ELECTRIC MOTOR

CROSS REFERENCE TO RELATED APPLICATIONS

This non-provisional patent application claims priority under 35 U.S.C. §119(a) from Patent Application No. GB0809764.4 filed in The United Kingdom on May 30, 2008.

FIELD OF THE INVENTION

This invention relates to an electric motor and in particular to a PMDC motor having EMI suppression.

BACKGROUND OF THE INVENTION

Small electric motors, such as sub-fractional horsepower PMDC motors, also known as miniature motors, have many applications. They are popular in home and office equipment and are especially common in modern vehicles for operating a variety of accessories. Often, these applications are sensitive to EMI (electro-magnetic interference) and the motors must be shielded or suppressed to avoid generating excessive EMI.

Common suppression techniques involve filter circuits connected to or across terminals of the motor. Common filter circuits involve capacitors, inductors, varistors and combinations thereof.

For most applications a simple ring varistor fitted to the commutator and a line capacitor connected across the motor terminals is sufficient. For more strict regulations and/or larger motors line inductors and earth capacitors may be used in addition to or instead of the varistor and line capacitor.

However, while this works well for most motors we have discovered that some motors produce a higher EMI emission in the UKW frequency range (68-108 MHz range). One such motor is a 4 pole 6 slot PMDC brush type motor which is used in a vehicle air-conditioning system. Unfortunately, the traditional varistor and line capacitor filter does not suppress emissions in this frequency range as well as desired.

SUMMARY OF THE INVENTION

Thus, it is an object of the present invention to provide a miniature PMDC motor with a EMI suppression circuit having good suppression in the UKW frequency range or at least to provide the public with a useful choice. This is achieved by using a suppression circuit incorporating a ferrite bead.

Accordingly, in one aspect thereof, the present invention provides a noise suppression circuit for an electric motor having motor terminals, a commutator and brushes, the circuit comprising: an electrical connection connecting at least one of the terminals to at least one of the brushes; and a ferrite bead forming a part of the electrical connection and being electrically connected in series between said terminal and said brush.

Preferably, the motor has two motor terminals, two brushes and two electrical connections, each electrical connection comprising a ferrite bead.

Preferably, the or each ferrite bead is a chip type ferrite bead.

Optionally, a line capacitor is connected between the motor terminals.

According to a second aspect thereof, the present invention provides an electric motor comprising: a permanent magnet stator; a wound rotor including a shaft, a rotor core fixed to the shaft so as to confront the stator, a commutator, and a plurality of windings wound on the rotor core and terminated on the commutator; motor terminals for connecting the motor to a source of electrical power; brush gear including at least two brushes for electrically connecting the windings to the motor terminals; and a noise suppression circuit for reducing the EMI emissions from the motor, wherein the noise suppression circuit includes a first ferrite bead component in series between a first motor terminal and a first brush.

Preferably, the noise suppression circuit includes a second ferrite bead component connected in series between the second motor terminal and the second brush.

Preferably, the first and second ferrite beads are chip type ferrite beads.

Preferably, the motor has an end cap which supports the motor terminals and the brush gear and the ferrite beads are fitted to pockets formed in the end cap.

Preferably, each ferrite bead has two bead terminals forming caps on each end of the chip, and each motor terminal has a terminal contact portion which makes electrical contact with a first one of the bead terminals.

Preferably, each of the brushes is connected to a respective one of the ferrite beads by a brush link, and each brush link has a link contact portion which makes electrical contact with a second one of the bead terminals.

Preferably, in each pocket, at least one of the terminal contact portion and the link contact portion has a projection which projects above the ferrite bead to retain the ferrite bead within the pocket.

Preferably, each terminal contact portion and each link contact portion has a projection which projects above the respective ferrite bead to retain the ferrite bead within the respective pocket.

Preferably, in each pocket, one of the terminal contact portion and the link contact portion has a resiliently deformable finger bearing against an end of the ferrite bead and pressing the ferrite bead into contact with the other of the terminal contact portion and the link contact portion.

Preferably, the terminal contact portions extend about an edge of the ferrite bead and face an end and a surface of the respective ferrite bead.

Preferably, the link contact portions extend about an edge of the ferrite bead and face an end and a surface of the respective ferrite bead.

Preferably, the pocket has a resiliently deformable front wall which is resiliently deformed by the ferrite bead and urges the ferrite bead towards a back wall of the pocket.

Preferably, each front wall has a ridge at each side portion, the ridges bearing on the respective ferrite bead at end portions thereof.

Preferably, the noise suppression circuit further includes a capacitor connected between the motor terminals.

Preferably, the or each ferrite bead is electrically connected between the motor terminal and brush by a releasable mechanical connection.

BRIEF DESCRIPTION OF THE DRAWINGS

A preferred embodiment of the invention will now be described, by way of example only, with reference to figures of the accompanying drawings. The figures are listed below.

Figure 1:
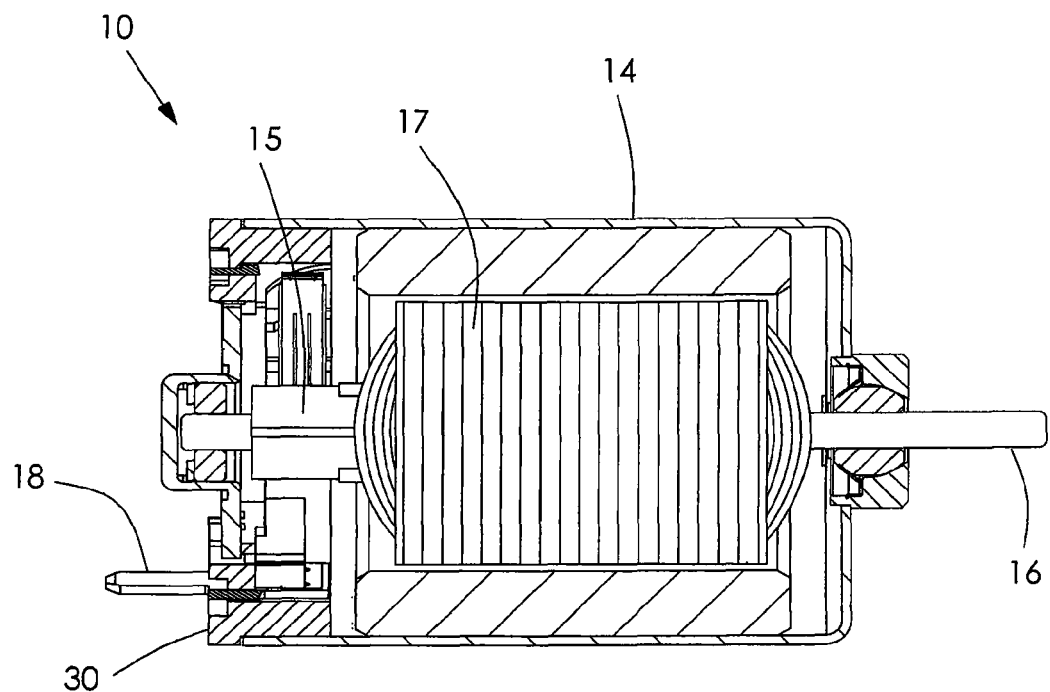
FIG. 1 illustrates a typical PMDC motor to which the present invention is applicable.

In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale.

DETAILED DESCRIPTION OF THE PREFERRED EMBODIMENTS

The preferred PMDC motor 10 has an EMI suppression circuit 12 incorporating a ferrite bead 20. A ferrite bead is a passive electric component used to suppress high frequency noise in electronic circuits and is often employed on computer cables. Ferrite beads are similar to inductors in some ways but work especially well in an area that is parasitic for general purpose inductors. They act as a high impedance to high frequency EMI/RFI electronic noise. The absorbed energy is converted to heat and dissipated.

Figure 3:
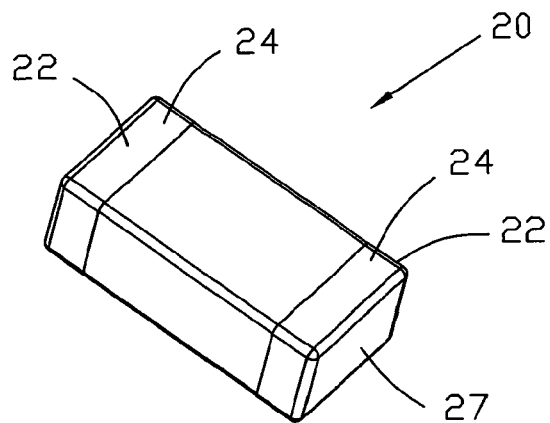
FIG. 3 is a perspective view of a chip type ferrite bead, being a component of the circuit of FIG. 2.

The preferred ferrite bead 20 is a multi-layer ceramic part of the chip type construction or outlook as shown in FIG. 3. Such components are available from a number of manufacturers. The preferred component has its highest impedance, up to 600 ohm, at 100 MHz. Using this component it has been possible to build a PMDC motor which achieves CISPR 25 conductive and radiated emission at level 5. CISPR 25 is an EMI emission test standard popularly used in the automotive industry. It has a conductive and radiative part with levels 1 to 5 (with level 5 having the highest standard).

Embodiments of the invention can achieve CISPR 25 Level 5 in the UKW frequency range. A small line capacitor (of say 0.33 uF) may be added to suppress the LW and MW frequency ranges, to achieve Level 5 for all frequency ranges.

This suppression circuit is particularly beneficial when used on the 4 pole 6 slot permanent magnet direct current motor used in vehicle air-conditioning systems, due to the high EMI emission in the 100 MHz range for this particular motor.

FIG. 1 illustrates a typical PMDC motor to which this invention has particular application. The motor has a deep drawn metal housing 14 having a number of magnets fitted to the inner surface of the housing to form the stator. A wound rotor confronts the stator. The rotor has windings wound about poles of a rotor core and terminated on a commutator. An end cap 30, carrying brush gear, such as brushes 19, closes the open end of the housing. The closed end of the housing and the end cap retain bearings in which the motor shaft 16 is journalled. The end cap supports the motor terminals, the brush gear and the noise suppression circuit. The brush gear brings power to the rotor windings via the commutator. This suppression circuit is especially useful for 4 pole, 6 slot, PMDC motors which means that the stator has 4 magnetic poles and the rotor has 6 poles.

Figure 2:
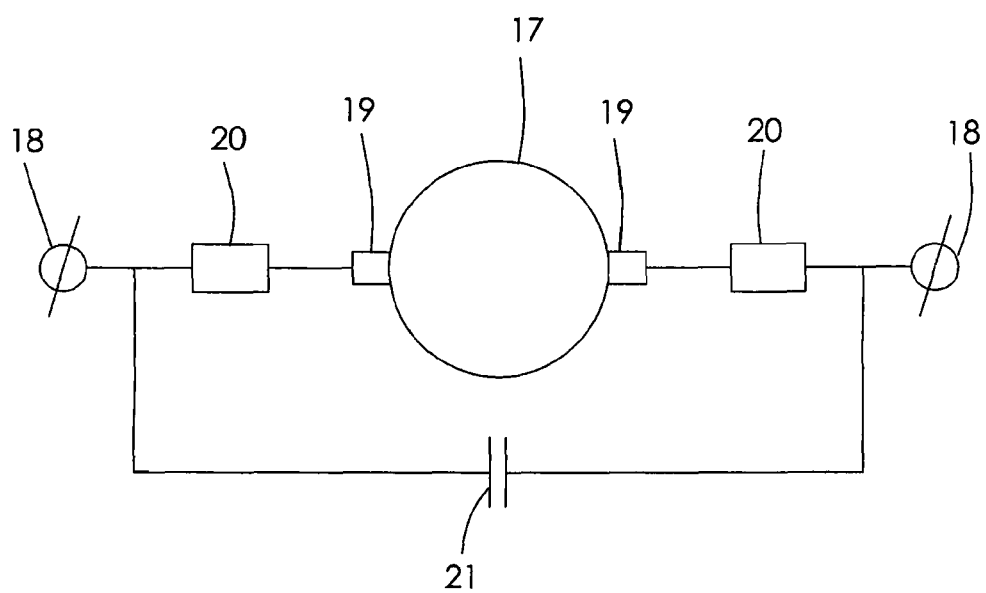
FIG. 2 is a circuit diagram of a noise suppression circuit according to a preferred embodiment of the present invention for use with the motor of FIG. 1.

The electrical circuit is shown in FIG. 2. Two chip type ferrite beads 20 are connected in series between the motor terminals 18 and the brushes 19. Brushes 19 transfer power to rotor 17, in particular, to rotor windings via a commutator. A line capacitor 21 is connected across the motor terminals 18 to provide additional filtering for the lower frequencies.

Figure 4:
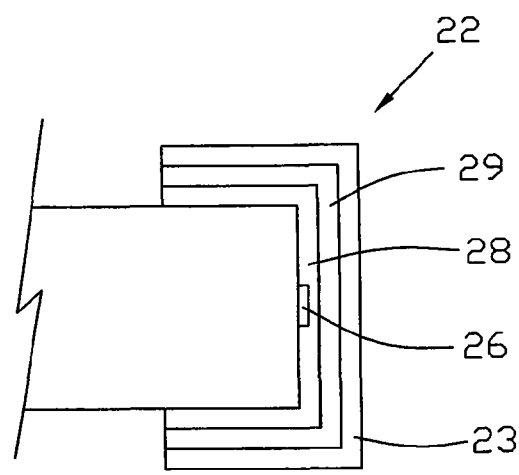
FIG. 4 is a schematic breakaway view of the ferrite bead of FIG. 3.

FIG. 3 illustrates the preferred chip type ferrite bead 20. It has a rectangular prism appearance with two opposite ends 22 each provided with a solder coating creating a pair of terminals 24 in the form of contact pads. FIG. 4 is a schematic illustration on an exaggerated scale of a part of the ferrite bead 20 of FIG. 3 with one contact pad sectioned to show its construction. The ceramic base 25 has an electrode 26 formed along the axial end face 27. A silver metallization layer 28 is applied to the ceramic base 25 and over the electrode 26 to the dimensions of the solder pad. The silver layer 28 is covered with a layer of nickel 29 to which a solder layer is applied, thus forming the solder contact pad. Both contact pads have similar construction.

Figure 5:
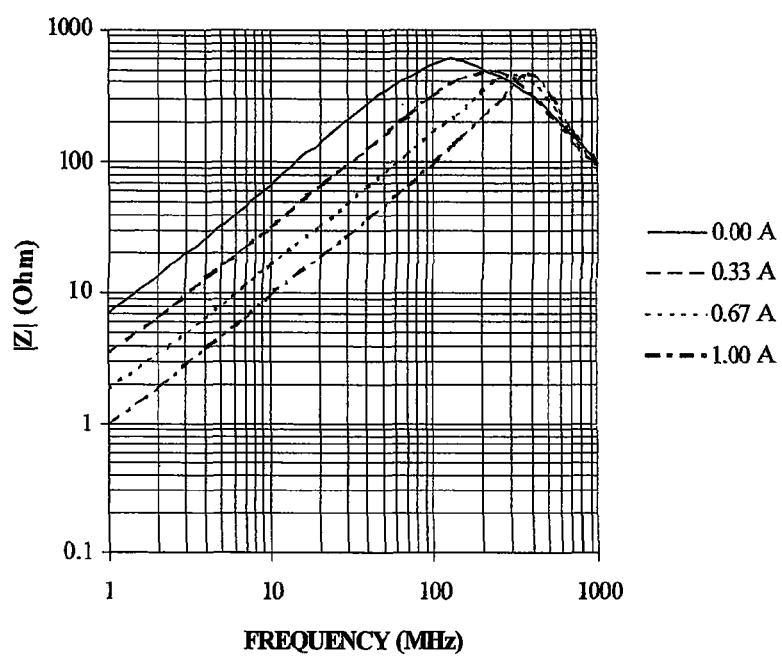
FIG. 5 is an impedance v frequency graph showing typical characteristics of the ferrite bead of FIG. 3.

FIG. 5 is a graph of typical impedance v frequency characteristics for this type of chip type ferrite bead. As can be seen, peak impedance occurs in the 100-500 MHz frequency range.

By the use of ferrite beads as a major component in the suppression circuit, high frequency EMI emissions from the motor can be significantly reduced. In particular, the use of a chip type ferrite bead suppression element allows the suppression circuit to be conveniently located within the motor, preferably accommodated within the end cap.

The end cap of PMDC motors is usually very compact with little room to spare which makes the accommodation of components for the suppression circuit very difficult. For this particular suppression circuit, the ferrite beads 20 are connected into the electrical circuit between each motor terminal 18 and its respective brush 19, which gives better suppression results. It is also desirable to be able to assemble the end cap, complete with the suppression components, with a minimum of effort and there is a secondary desire to avoid the use of solder.

This is achieved in the preferred end cap embodiment illustrated in FIGS. 6 to 10 which are used to illustrate the concept. It will be appreciated that the ferrite bead chips are held within the pockets of the end cap and connected to the electrical circuits without the use of soldered connections, although, of course, the contact pads of the ferrite bead chips are solder coated. Thus the electrical connection with and retention off the chip is by physical contact. In the example shown, the end cap 30 is a two part end cap having a metal plate 31 which directly supports a bearing 32 of the rotor and a plastics material part also known as a brush plate 33 which directly supports the motor terminals 18 and the brush gear, including the brushes 19. The brush plate 33 may support other electrical components where fitted. In this case the end cap supports components of the noise suppression circuit, such as the two chip type ferrite beads 20 and the line capacitor (if necessary).

The arrangement for each ferrite bead is the same and will be described now with reference to only one of the beads. The bead 20 is located in a recess or pocket 34 formed in the inner surface of the brush plate 33. The pocket 34 has a bottom, an open top, two end walls, a back wall and a front wall 35. The front wall 35 is a arranged so as to be resiliently deformable. This is achieved by the front wall 35 projecting upwardly from the bottom of the pocket 34 without being joined to the end walls, at least for a substantial part of the height of the front wall 35. The back wall forms a part of an outer peripheral wall 36 of the brush plate 33 and is relatively rigid.

Located within the pocket 34 are contact portions of the respective motor terminal 18 and brush link 38 (which forms a base for the respective brush 19). The contact portion 37 of the motor terminal 18 extends along the back wall in a groove 40 in the bottom and extends to the remote end wall where it forms a contact finger 41 which is arranged to bear on and press against one end or terminal 24 of the ferrite bead 20. The other end or terminal 24 of the ferrite bead is pressed against the contact portion 39 of the brush link 38 which extends into the pocket 34 through the gap between the front wall 35 and the proximal end wall, lines the proximal end wall and extends slightly along the back wall but spaced above the motor terminal 18. The pressing force comes from the resilient deformation of the contact finger 41 when the ferrite beard 20 is pressed into the pocket 34. This resilient deformation produces a physical connection between the ferrite bead chip 20 on the one hand and the motor terminal 18 and the brush link 38 on the other, thus eliminating the need to solder the hip to the contact portions. Burs or barbs may be formed on the resilient contact finger 41 due to the forming method, e.g. shearing and bending, to aid retention of and connection with the chip 20.

The terminal contact portion 37 and the link contact portion 39 have a small projection 42 extending into the pocket 34 formed by stamping a dimple into the other side of the contact portions. The projections 42 are located at the back wall near to the end walls and serve to provide a restriction to the removal of the ferrite bead 20 from the pocket 34 as they project over the bead 20. The pocket 34 is sized such that the ferrite bead 20 causes resilient deformation of the front wall 35 which then presses the bead 20 towards the back wall and against the terminal and link contact portions 37, 39. This produces a pressing force on the chip pressing it against the back wall of the pocket and/or the contact portions 37, 39. This pressing force works in conjuction with the contact projections 42 formed by the dimples to prevent the chip from accidentally moving out of the pocket by, for example, under the influence of vibrations.

Figure 6:
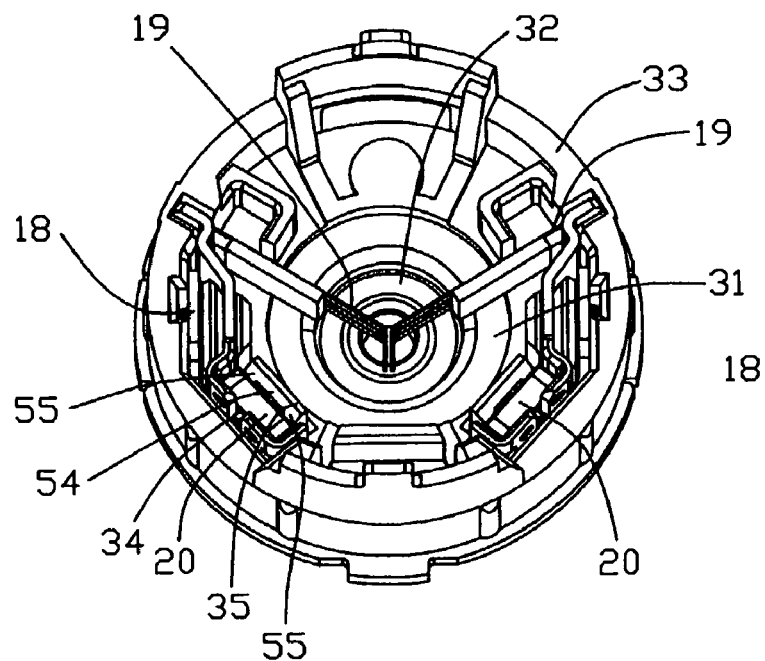
FIG. 6 is an inside plan view of an end cap according to a preferred embodiment of the present invention for a PMDC motor, such as the motor of FIG. 1.
Figure 7:
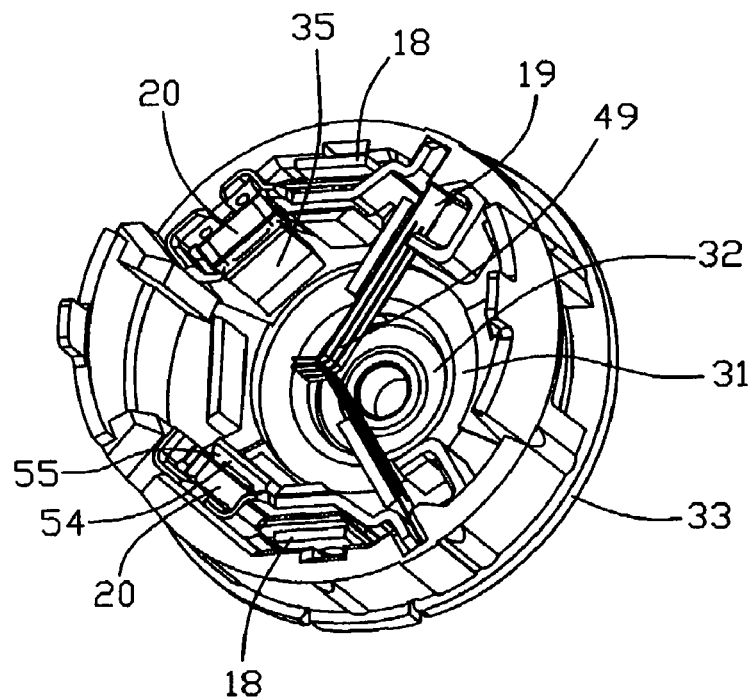
FIG. 7 is a perspective view of the end cap assembly of FIG. 6.
Figure 8:
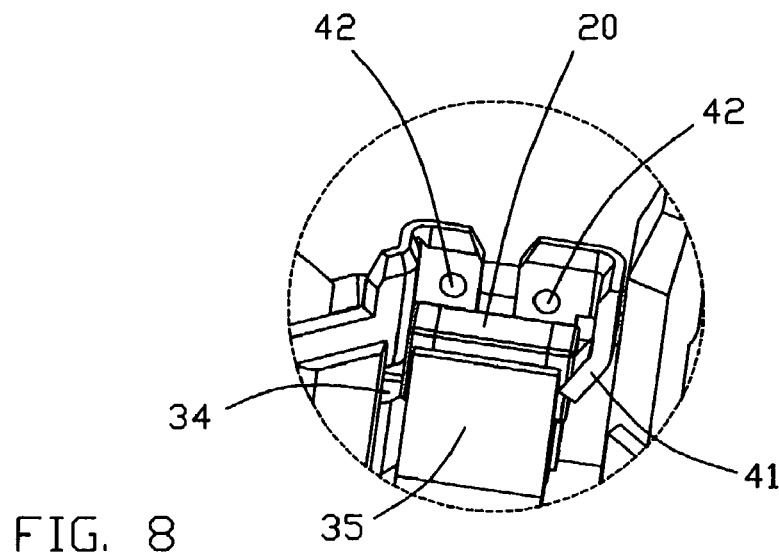
FIG. 8 is an enlarged view of the ferrite bead installed in the end cap assembly of FIG. 6.

As may be seem in FIGS. 6 & 7, the front wall 35 has a chamfered top edge 54 to ease insertion of the ferrite bead 20 into the pocket 34. The front wall 35 also has two vertical ridges 55, one at each end of the wall extending into the pocket 34. The ridges 55 bear against the adjacent surface of the ferrite bead at the end portions thereof. This gives a more even and consistent pressing force against the ferrite bead than using a broad flat surface to press the ferrite bead.

Figure 9:
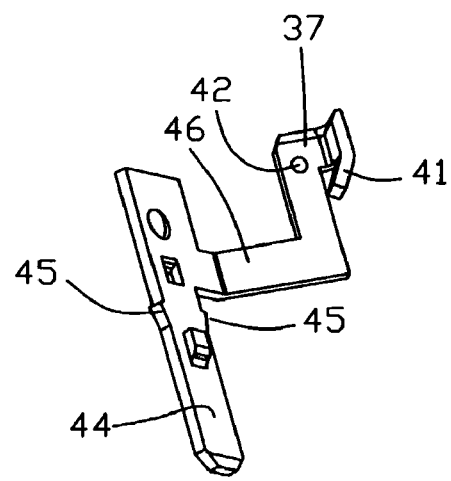
FIG. 9 is a perspective view of a motor terminal, being a component part of the end cap assembly of FIG. 6.

FIG. 9 illustrates one of the motor terminals 18. The terminal 18 has a spade type male terminal portion 44 for connection to a motor lead. Two barbs 45 at the base of the terminal portion 44 are used to fix the motor terminal 18 to the end cap 30. An extension 46 which locates in terminal groove 40 extends between the terminal portion 44 to the terminal contact portion 37. During assembly of the motor terminal 18 to the end cap 30, the terminal portion 44 is passed through a hole in the brush plate 33 from the inside such that the extension 46 is against the bottom of terminal groove 40. The barbs 45 retain the motor terminal 18 in the hole by biting into and gripping the plastics material of the wall of the hole which is deformed by insertion of the terminal portion 44 and bards 45.

Figure 10:
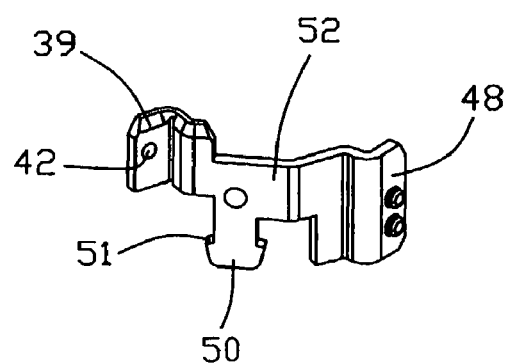
FIG. 10 is a perspective view of a brush link, being a component part of the end cap assembly of FIG. 6.

FIG. 10 illustrates one of the brush links 38. The brush link 38 has a base portion 48 adapted for fixing a brush 19 thereto. Preferably the brush 19 is of the finger leaf type having a single elongate member of resilient electrically conductive material, such as beryllium copper, with the free end arranged to make direct sliding contact with a commutator. The free end may be divided into a number of brush fingers 49, as shown in FIG. 7. Alternatively, the bush may be of the leaf brush type wherein the free end of the brush supports a brush body such as a carbon brush for making sliding contact with the commutator. A link portion 52 extends between the base portion 48 and the link contact portion 39. A fixing projection 50 extends from the link portion 52 which is pressed into a hole in the brush plate 33 to fix the brush link 38 to the end cap 30. Barbs 51 are provided to resist removal of the fixing portion 50 once inserted.

As can be understood, certain embodiments of the present invention provide a simple yet effective and efficient method of incorporating a ferrite bead, in particular a chip type ferrite bead, into the end cap of an electric motor without the need for soldering. Soldering on an assembly line is considered dangerous to workers health due to the emitted fumes and effort is being taken to avoid soldering except in special production facilities. However, the presence of solder on the contact ends of the ferrite bead chip is acceptable as no soldering or melting of this solder occurs during assembly of the motor. The solder layer on the contact ends provide a good electrical connection with the motor terminal and brush link even though the chip is not soldered to the motor terminal and brush link.

A preferred form of the suppression circuit has been described by way of example only and certain variations and modifications will be readily apparent to those skilled in the art. The scope of the invention is to be determined only by reference to the accompanying claims. For example, the end cap is described as a two part end cap, having an outer metal plate and an inner plastics material brush plate. However, the invention is equally applicable to a single piece end cap or end caps of other constructions.

Also, the contact finger 41, while shown provided on the motor terminal 18, could be provided on the brush link 38 instead of or in addition to being provided on the motor terminal 18.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. An electric motor comprising:
   a permanent magnet stator;
   a wound rotor including a shaft, a rotor core fixed to the shaft so as to confront the stator, a commutator, and a plurality of windings wound on the rotor core and terminated on the commutator;
   motor terminals for connecting the motor to a source of electrical power;
   brush gear including at least two brushes for electrically connecting the windings to the motor terminals; and
   a noise suppression circuit for reducing the EMI emissions from the motor,
   wherein the noise suppression circuit includes a ferrite bead component in series between one of the motor terminals and one of the brushes,
   wherein the ferrite bead has two bead terminals, and said one of the motor terminals has a terminal contact portion which makes electrical contact with one of the bead terminals,
   the terminal contact portion extends about an edge of the ferrite bead and faces an end and a surface of the ferrite bead.

2. An electric motor comprising:
   a permanent magnet stator;

a wound rotor including a shaft, a rotor core fixed to the shaft so as to confront the stator, a commutator, and a plurality of windings wound on the rotor core and terminated on the commutator;

motor terminals for connecting the motor to a source of electrical power;

brush gear including at least two brushes for electrically connecting the windings to the motor terminals; and a noise suppression circuit for reducing the EMI emissions from the motor, wherein the noise suppression circuit includes a ferrite bead component in series between one of the motor terminals and one of the brushes, wherein the ferrite bead has two bead terminals, and said one of the brushes is connected to the ferrite bead by a brush link, and the brush link has a link contact portion which makes electrical contact with one of the bead terminals, and the link contact portion extends about an edge of the ferrite bead and faces an end and a surface of the ferrite bead.

3. The motor of claim 2, wherein said one of the motor terminals has a terminal contact portion which makes electrical contact with the other of the bead terminals, and the terminal contact portion extends about another edge of the ferrite bead and faces another end and a surface of the ferrite bead.

4. An electric motor comprising:
a permanent magnet stator;
a wound rotor including a shaft, a rotor core fixed to the shaft so as to confront the stator, a commutator, and a plurality of windings wound on the rotor core and terminated on the commutator;
motor terminals for connecting the motor to a source of electrical power;
brush gear including at least two brushes for electrically connecting the windings to the motor terminals; and
a noise suppression circuit for reducing the EMI emissions from the motor,
wherein the noise suppression circuit includes a first ferrite bead component in series between a first motor terminal and a first brush, and a second ferrite bead component connected in series between the second motor terminal and the second brush, the first and second ferrite beads being chip type ferrite beads;
wherein the motor has an end cap which supports the motor terminals and the brush gear, and the ferrite beads are fitted to pockets formed in the end cap;
wherein the pocket has a resiliently deformable front wall which is resiently deformed by the ferrite bead and urges the ferrite bead towards a back wall of the pocket; and
wherein each front wall has a ridge at each side portion, the ridges bearing on the respective ferrite bead at end portions thereof.

5. The motor of claim 4, wherein each ferrite bead has two bead terminals forming caps on each end of the chip, and each motor terminal has a terminal contact portion which makes electrical contact with a first one of the bead terminals.

6. The motor of claim 5, wherein each of the brushes is connected to a respective one of the ferrite beads by a brush link, and each brush link has a link contact portion which makes electrical contact with a second one of the bead terminals.

7. An electric motor comprising:
a permanent magnet stator;
a wound rotor including a shaft, a rotor core fixed to the shaft so as to confront the stator, a commutator, and a plurality of windings wound on the rotor core and terminated on the commutator;
motor terminals for connecting the motor to a source of electrical power;
brush gear including at least two brushes for electrically connecting the windings to the motor terminals; and
a noise suppression circuit for reducing the EMI emissions from the motor,
wherein the noise suppression circuit includes a first ferrite bead component in series between a first motor terminal and a first brush, and a second ferrite bead component connected in series between the second motor terminal and the second brush, the first and second ferrite beads are chip type ferrite beads;
wherein the motor has an end cap which supports the motor terminals and the brush gear, and the ferrite beads are fitted to pockets formed in the end cap;
wherein each ferrite bead has two bead terminals forming caps on each end of the chip, and each motor terminal has a terminal contact portion which makes electrical contact with a first one of the bead terminals;
wherein each of the brushes is connected to a respective one of the ferrite beads by a brush link, and each brush link has a link contact portion which makes electrical contact with a second one of the bead terminals;
wherein in each pocket, at least one of the terminal contact portion and the link contact portion has a projection which projects above the ferrite bead to retain the ferrite bead within the pocket.

8. The motor of claim 7, wherein each terminal contact portion and each link contact portion has a projection which projects above the respective ferrite bead to retain the ferrite bead within the respective pocket.

9. The motor of claim 8, wherein in each pocket, one of the terminal contact portion and the link contact portion has a resiliently deformable finger bearing against an end of the ferrite bead and pressing the ferrite bead into contact with the other of the terminal contact portion and the link contact portion.

10. The motor of claim 7, wherein the terminal contact portions extend about an edge of the ferrite bead and face an end and a surface of the respective ferrite bead.

11. The motor of claim 7, wherein the link contact portions extend about an edge of the ferrite bead and face an end and a surface of the respective ferrite bead.

12. The motor of claim 7, wherein the pocket has a resiliently deformable front wall which is resiently deformed by the ferrite bead and urges the ferrite bead towards a back wall of the pocket.

13. The motor of claim 7, wherein the noise suppression circuit further includes a capacitor connected between the motor terminals.

14. The motor of claim 7, wherein each ferrite bead is electrically connected between the motor terminal and brush by a releasable mechanical connection.

* * * * *